E. MOWRY.
SIDE DELIVERY RAKE AND TEDDER.
APPLICATION FILED JUNE 27, 1918.

1,329,468.

Patented Feb. 3, 1920.

Inventor.
Edward Mowry.
by Chas. E. Lord
Atty

UNITED STATES PATENT OFFICE.

EDWARD MOWRY, OF STERLING, ILLINOIS, ASSIGNOR, BY MESNE ASSIGNMENTS, TO INTERNATIONAL HARVESTER COMPANY, A CORPORATION OF NEW JERSEY.

SIDE-DELIVERY RAKE AND TEDDER.

1,329,468.    Specification of Letters Patent.    Patented Feb. 3, 1920.

Application filed June 27, 1918. Serial No. 242,226.

*To all whom it may concern:*

Be it known that I, EDWARD MOWRY, a citizen of the United States, residing at Sterling, in the county of Whiteside and State of Illinois, have invented certain new and useful Improvements in Side-Delivery Rakes and Tedders, of which the following is a full, clear, and exact specification.

This invention relates to combined side delivery rakes and tedders, and more particularly to the means for controlling the angularity of the rake teeth.

The invention has for one of its objects to improve and simplify the construction of the rake teeth controlling mechanism.

A further object is to provide a construction having few parts for easily and quickly adjusting the rake teeth to the proper position for fufilling the desired function.

With these and other objects in view, the invention consists in means such as an eccentric for changing the angularity of the rake teeth, and in improved means for controlling the position of the eccentric.

One embodiment of the invention is illustrated in the accompanying drawings, and in these drawings,—

Figure 1:
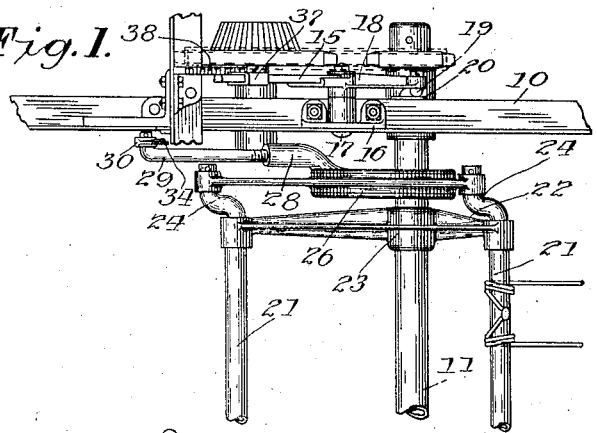
Figure 2:
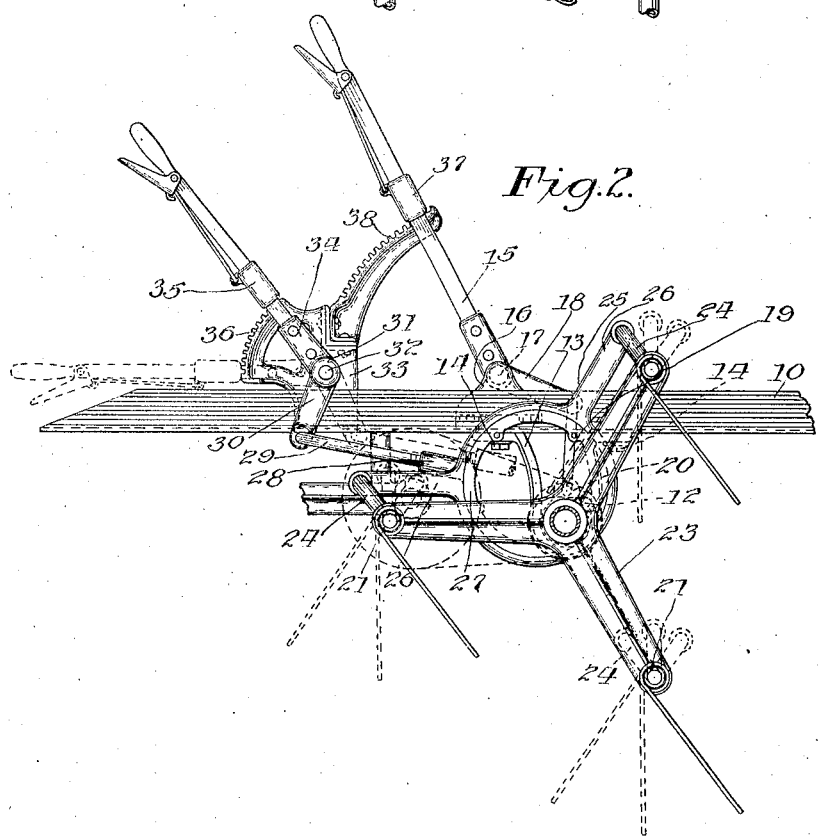

Figure 1 shows a fragmentary plan view of those portions of the side delivery rake and tedder necessary to illustrate my improved invention; and Fig. 2 shows a side elevation of the construction shown in Fig. 1.

The machine in connection with which my improved construction is illustrated is the usual type of combined side delivery rake and tedder having a diagonally disposed rake frame extending rearwardly from the axle of the machine, and a portion of this diagonally disposed frame is illustrated at 10 in Fig. 1. The raking cylinder is carried by the usual rake shaft 11 which is supported at its inner end in a bearing box 12 which in turn is adjustably supported in the slotted bracket 13 secured by means of suitable bolts 14 to the frame 10. The outer end of the rake shaft is supported in any suitable manner upon the rake frame, this construction not being illustrated in the drawings. The bearing box 12 is provided with suitable adjusting means, and in the embodiment of the invention illustrated a lever 15 is pivotally mounted in a bracket 16 secured to the frame 10, and the pivot pin 17 of the lever has secured thereto a crank arm 18 which is connected by means of a link 19 to an upwardly projecting eye 20 carried by the bearing box. The raking cylinder has the usual rake heads 21 journaled in the outer ends of arms 22 of the spider 23 carried by the rake shaft 11. Crank arms 24 are secured to the ends of the rake heads 21 and support an adjustable spider 25, the outer ends of the arms 26 of this adjustable spider being mounted on the ends of the crank arms. The position of the adjustable spider 25 is controlled by means of an eccentric ring 27 which is adjustably mounted on the machine frame in the manner described below. The eccentric 27 is provided with a projecting portion 28 preferably formed integral therewith, and this projecting portion is connected by means of a link 29 to a crank arm 30 carried by a sleeve 31 journaled on the stub shaft 32. As illustrated in Fig. 2, the link 29 has a screw threaded connection with the projection 28. The stub shaft 32 is carried by a bracket 33 secured to the frame 10.

For the purpose of adjusting the crank arm 30 I have secured to the sleeve 31 a lever 34, the lower portion of which may be formed integral with the sleeve if desired. The lever 34 is provided with the usual pawl mechanism 35 which coöperates with a toothed sector 36 formed on the bracket 33 in holding the lever in its adjusted position. The lever 15 above described is also provided with pawl mechanism 37 which coöperates with a toothed sector 38 also secured to the bracket 33 as shown in Fig. 2.

In Fig. 2 I have illustrated in dotted lines the position assumed by the teeth and by the controlling mechanism when they are adjusted for raking, the full line position showing the adjustment for tedding. The neutral position will of course be located halfway between these two extreme positions, and in the neutral position the cranks 24 and the rake teeth will be disposed vertically.

In view of the simplicity of the construction and of the detailed description above, it is believed that a description of the operation of the mechanism is unnecessary. Attention is, however, called to the fact that the eccentric 27 has substantially no rotary movement during its adjustment, but that the movement thereof is substantially horizontal.

From the above specification taken in connection with the drawings, it will be seen that I have provided an exceedingly simple and efficient construction for the purpose desired, and that this construction has very few parts and may be quickly and easily adjusted to adapt the machine for raking or tedding operations.

While I have in the above specification described one embodiment which my invention may assume, it should be understood that the invention is capable of modification and that modifications may be employed without departing from the spirit and scope of the invention as expressed by the following claims.

1. In a combined side delivery rake and tedder, a rake shaft, a rotary raking frame carried thereby, rake teeth carried by said frame, means including an eccentric for controlling the movement of said rake teeth as the raking frame is rotated, and means for bodily adjusting said eccentric with respect to said shaft in a substantially horizontal direction.

2. In a combined side delivery rake and tedder, a frame, a rake shaft, rake teeth operatively connected thereto, means including an eccentric movable bodily with respect to said rake shaft for controlling the position of said rake teeth, lever mechanism carried by said frame, and means for connecting said lever mechanism to said eccentric whereby said eccentric may be adjusted with respect to said frame.

3. In a combined side delivery rake and tedder, a frame, a rake shaft carried thereby, a spider rotatably mounted on said rake shaft, rake heads carried by said spider, crank arms secured to said rake heads, an adjustable spider carried by said crank arms, an eccentric mounted for independent movement with respect to said rake shaft for adjusting said last named spider, and means carried by said frame for adjusting said eccentric.

In testimony whereof I affix my signature.

EDWARD MOWRY.